United States Patent [19]
Ueda et al.

[11] 4,414,937

[45] Nov. 15, 1983

[54] AUTOMATIC ENGINE STOP AND START APPARATUS

[75] Inventors: Masahiro Ueda; Masahiko Noba, both of Aichi, Japan

[73] Assignee: Toyota Jidosha Kogyo Kabushiki Kaisha, Toyota, Japan

[21] Appl. No.: 360,975

[22] Filed: Mar. 23, 1982

[30] Foreign Application Priority Data

Aug. 25, 1981 [JP] Japan .............................. 56-133079

[51] Int. Cl.³ ............................................. F02B 77/08
[52] U.S. Cl. ........................ 123/198 D; 123/198 DB; 123/198 DC; 123/179 A; 180/271
[58] Field of Search .... 123/198 D, 198 DB, 198 DC, 123/198 F, 179 A; 180/282, 283, 284, 271

[56] References Cited

U.S. PATENT DOCUMENTS

| | | | |
|---|---|---|---|
| 3,993,038 | 11/1976 | Alt et al. | 123/198 D |
| 4,033,311 | 7/1977 | Burson | 123/198 D |
| 4,192,279 | 3/1980 | Maisch et al. | 123/198 DB |
| 4,295,540 | 10/1981 | Hildebrecht | 123/198 D |
| 4,355,607 | 10/1982 | Blaney | 123/198 D |
| 4,362,133 | 12/1982 | Malik | 123/179 A |

*Primary Examiner*—Ira S. Lazarus
*Attorney, Agent, or Firm*—Oblon, Fisher, Spivak, McClelland & Maier

[57] ABSTRACT

An automatic engine stop and start apparatus for automatically stopping and starting an engine is disclosed. When a car starts to move while the engine has been automatically stopped and the car is to be braked, and a car velocity exceeds a predetermined speed and a booster pressure of a brake falls below a predetermined level, the apparatus issues an alarm. To this end, the apparatus includes a car velocity sensor for detecting the car velocity, a slope sensor for detecting the necessity of the brake for the car, a negative pressure switch for detecting the booster pressure of the brake and alarm means responsive to detection outputs of those sensors.

24 Claims, 5 Drawing Figures

AUTOMATIC ENGINE STOP AND START APPARATUS

BACKGROUND OF THE INVENTION

1. Field of the Invention

The present invention relates to an automatic engine stop and start apparatus for automatically stopping and starting an engine.

2. Description of Prior Art

When a driver of a car encounters a traffic jam due to a car accident or wait for traffic signal and is obliged to stop the car for a long time, he or she usually stops an engine and restarts the engine when the traffic jam has disappeared in order to avoid waste of fuel consumption due to long time idling operation of the car.

On the other hand, if the driver stops the engine each time he or she stops the car at a crosspoint in a town area to wait for the traffic signal, he or she has to restart the engine each time he or she starts the car. This is not only troublesome but also impedes rapid start of the car.

However, the stop time in the town area occupies a considerable portion of a total run time and hence the amount of exhaust gas exhausted and the amount of fuel consumed during the idling operation of the car cannot be neglected.

Accordingly, an automatic engine stop and start apparatus which automatically stops the engine under a predetermined condition such as the stop of the car at the crosspoint in the town area and restarts the engine in response to an ordinary start operation (step-on of a clutch pedal) has been developed.

In a prior art apparatus of this type, when the engine stop condition is met while the car is going up a slope and the engine is automatically stopped, a booster pressure of a brake is reduced resulting in the reduction of a braking force in spite of the necessity of the braking force.

SUMMARY OF THE INVENTION

It is an object of the present invention to provide an automatic engine stop and start apparatus which assures safety when an engine is automatically stopped under a condition in which a car is to be braked.

It is another object of the present invention to provide an automatic engine stop and start apparatus which issues an alarm to call an attention of a driver when a car starts to move while the engine has been automatically stopped under a condition in which the car is to be braked.

It is a further object of the present invention to provide an automatic engine stop and start apparatus which issues an alarm and enhances a braking force when a car starts to move while the car has been automatically stopped under a condition in which the car is to be braked.

A first characteristic feature of the present invention resides in the arrangement that, when the engine is automatically stopped and the car need be braked, if the car starts moving, the car velocity exceeds a predetermined value and the booster pressure of the brake is lowered to less than a predetermined value, then an alarm is issued. A second characteristic feature of the present invention resides in the arrangement that, when the engine is automatically stopped and the car need be braked, if the car starts moving, the car velocity exceeds a predetermined value and the booster pressure of the brake is lowered to less than a predetermined value, then an alarm is issued, and if the transmission is switched over to the neutral position in addition to the abovedescribed condition, then the engine is automatically started.

BRIEF DESCRIPTION OF THE DRAWINGS

FIGS. 2 to 4 show operation modes in a control circuit 1, in which FIG. 2 shows an operation mode in an ERS operation, FIG. 3 shows an operation mode in an automatic stop of an engine, and FIG. 4 shows an operation mode in an automatic start of the engine.

DETAILED DESCRIPTION OF THE PREFERRED EMBODIMENTS

Figure 1:
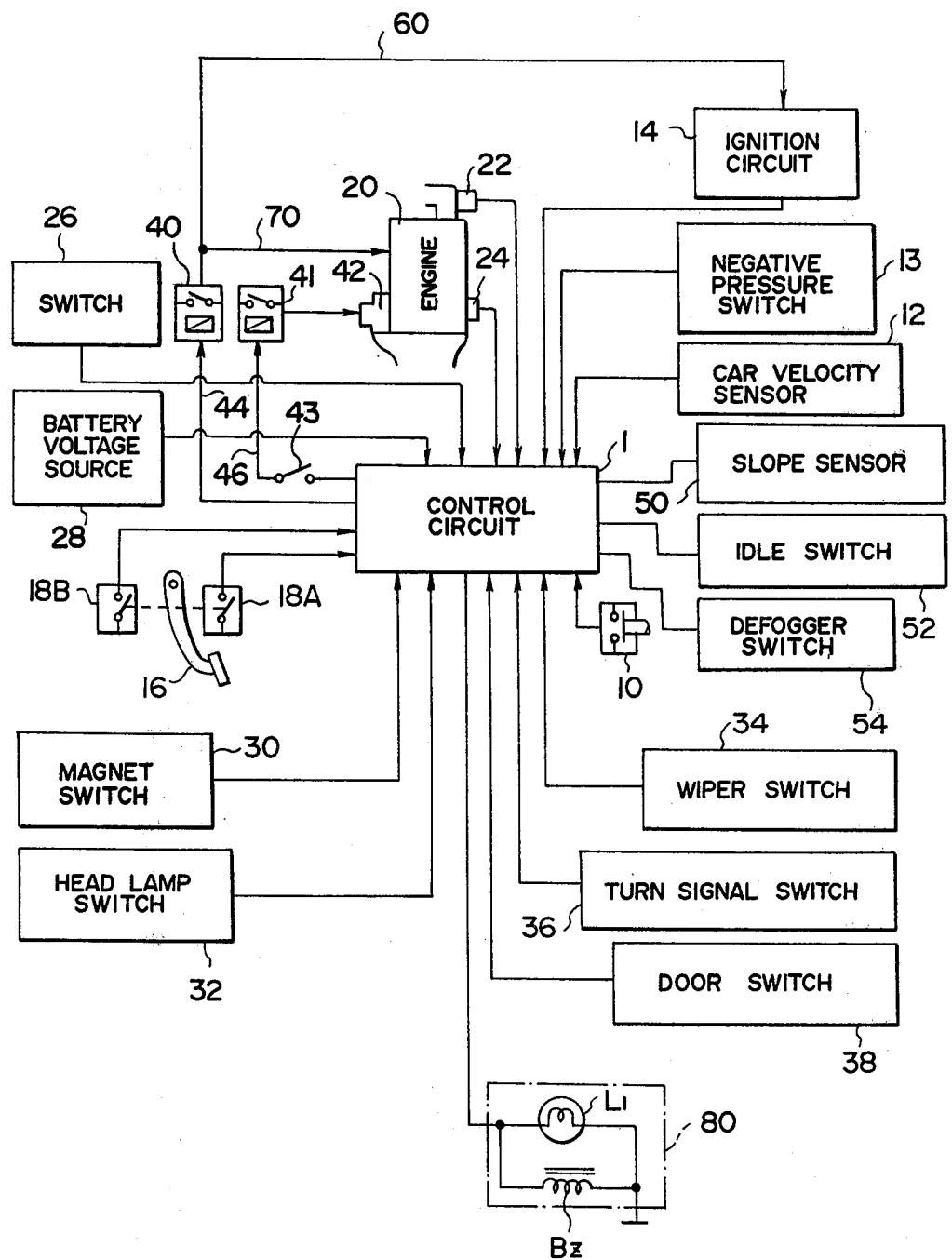
FIG. 1 shows a block diagram of an overall configuration of an automatic engine stop and start apparatus of the present invention.

FIG. 1 shows an overall configuration of an automatic engine stop and start apparatus of the present invention. In FIG. 1, numeral 1 denotes a control circuit which comprises a micro computer. Detected outputs from various sensors and circuits are applied to the control circuit 1. Numeral 10 denotes a main switch for setting and resetting an automatic engine stop and start function (hereinafter referred to as ERS). The ERS is set by depressing the main switch 10 after the engine has been started by an ordinary operation. The ERS is reset by depressing the main switch 10 again after the ERS has been set. The ERS is also automatically reset under a predetermined condition as will be described hereinlater.

Numeral 12 denotes a car velocity sensor which detects whether the car is running or stopped. A detection output from the sensor 12 is used to determine the automatic stop of the car. Numeral 13 denotes a negative pressure switch for detecting whether a booster pressure (negative pressure) of a brake is below a predetermined level or not, and numeral 14 denotes an ignition circuit which produces an ignition pulse signal which is processed in the control circuit 1 as an engine r.p.m. signal. The engine r.p.m. signal is used to determine the conditions for the ERS set, automatic engine stop, automatic engine start and ERS reset. Numeral 16 denotes a clutch pedal and numerals 18A and 18B denote clutch upper switch and clutch lower switch, respectively, which are turned on and off as the clutch pedal 16 is moved. Those switches detect the step-on amount of the clutch pedal 16. The clutch upper switch 18A is turned on when the clutch pedal 16 is stepped on by a certain percent (e.g. 30%) of a full stroke to send a signal to the control circuit 1, which functions to prevent the stop of the engine. The clutch lower switch 18B is turned on when the clutch pedal 16 is fully stepped on to send a signal (for permitting the automatic engine start) to the control circuit 1.

An engine 20 is provided with a water temperature sensor 22 for detecting a temperature of a coolant of the engine 20 and an oil pressure sensor 24 for detecting an oil pressure of an engine oil. Detection outputs from those sensors 22 and 24 are applied to the control circuit 1. Numeral 26 denotes a switch for indicating a generation condition of an alternator. The switch 26 is off when the alternator is generating. Numeral 28 denotes a battery voltage source and numeral 30 denotes a magnet switch which controls an actuation of an air conditioner. The magnet switch 30 is on when the air conditioner is actuated.

Numeral 32 denotes a head lamp switch for turning on and off head lamps and numeral 34 denotes a wiper switch for detecting an operation of a wiper. The switches 30, 32 and 34 detect whether electric loads are high or not. Numeral 36 denotes a turn signal switch which detects right turn of the car, and numeral 38 denotes a door switch which detects open or closed condition of a driver seat door. The detection output of the switch 36 is used to determine the automatic engine stop condition and the detection output of the switch 38 is used to determine the ERS set condition. Numeral 43 denotes a neutral switch which detects whether a transmission is in a neutral position or not. The switch 43 is linked to a shift lever of a transmission gear, and it is on when the transmission is in the neutral position and off when the transmission is in other position.

Numeral 50 denotes a slope sensor which detects whether a gradient of a slop on which the car has stopped is above a predetermined gradient (e.g. 2 degrees) and is turned on when it is above the predetermined gradient, numeral 52 denotes an idle switch which detects whether the engine is idling or not (and is turned on when it is idling), and numeral 54 denotes a defogger switch which detects whether a defogger is used or not. Numeral 80 denotes an alarm unit which issues an alarm when the car having the engine automatically stopped by the ERS function starts to move and the car velocity exceed a pedetermined speed and the booster pressure of the brake is lowered. It comprises an alarm lamp L1 and a buzzer BZ. Instead of the alarm lamp L1, a display device such as a light emitting diode or a liquid crystal device may be used.

When the predetermined conditions are met and the ERS is set by the main switch 10, the engine 20 is automatically stopped and started in the following manner. As the stop condition for the engine 20 is met, the control circuit 1 provides an engine stop signal 44 to a fuel cut relay 40. As a result, the fuel cut relay 40 supplies a fuel cut signal 70 to a fuel cut solenoid (not shown) of a fuel supply system in the engine 20 and an ignition cut signal 60 to the ignition circuit 14 so that the engine 20 is stopped. Alternatively, the engine may be automatically stopped by cutting the ignition only without cutting the fuel. In this case, however, a feeling of drive is degraded because of run-on of the engine.

On the other hand, if the clutch pedal 16 is fully stepped on when the ERS is in set condition and the engine is stopped, the clatch lower switch 18B is turned on, and if other conditions (to be described later) are met, the control circuit 1 provides an engine start signal 46 to a start relay 41 through the neutral switch 43. As a result, a starter 42 is energized to start the engine 20.

Figure 2:
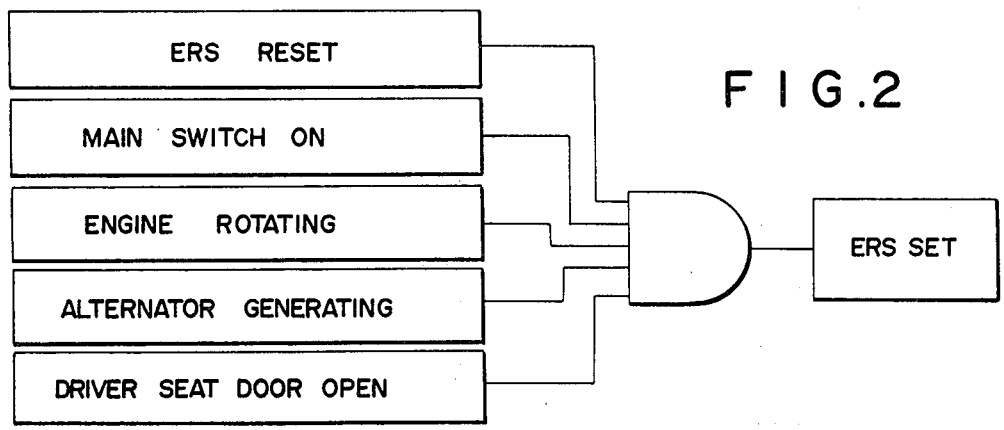
Figure 3:
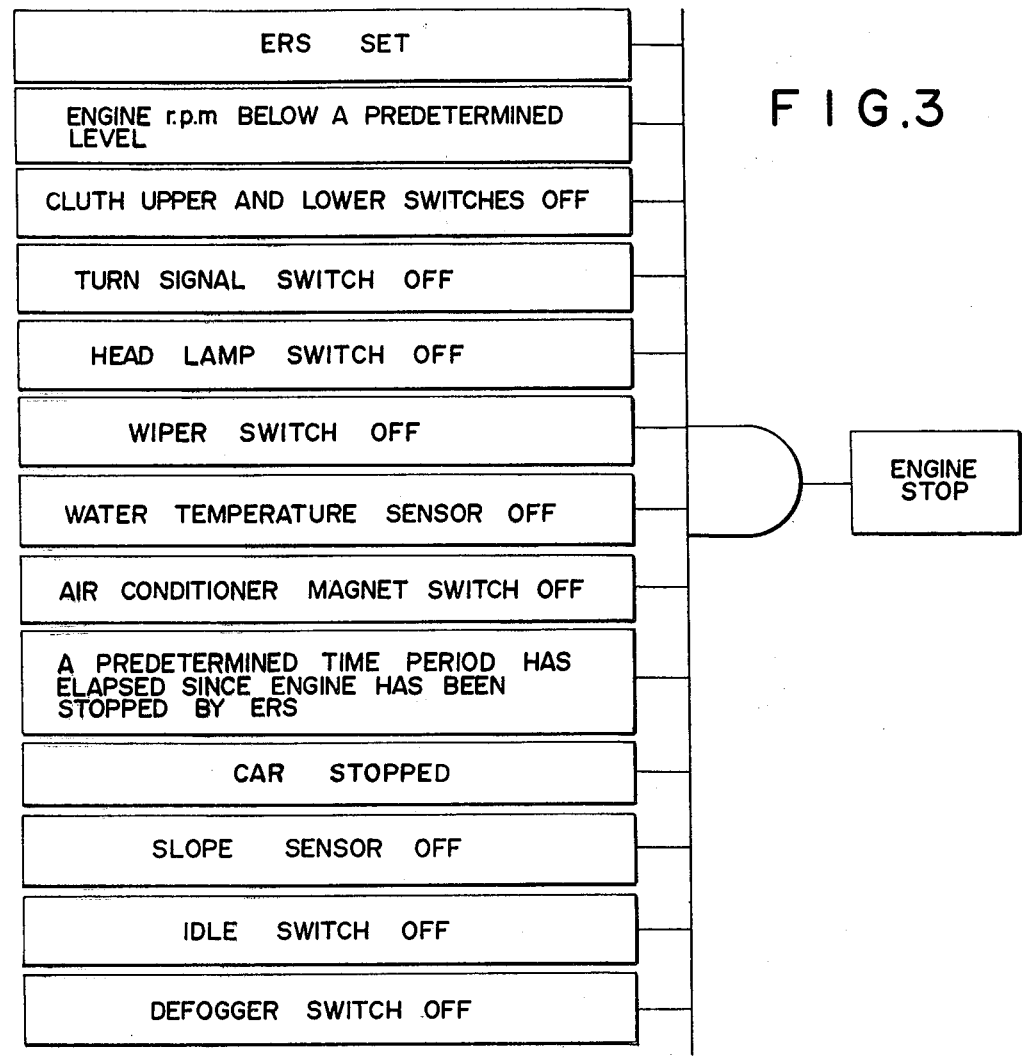
Figure 4:
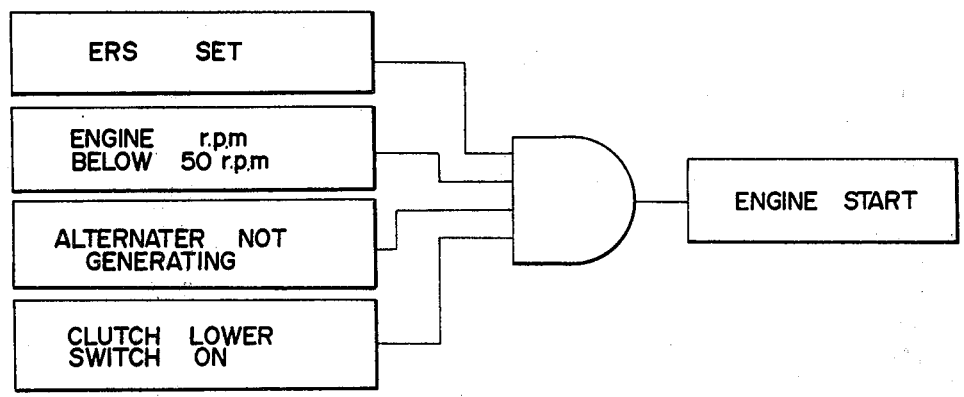

Referring now to FIGS. 2 to 4, the operation modes of the automatic engine stop and start apparatus shown in FIG. 1 for the ERS set and the engine stop and start after the ERS set are explained. FIG. 2 shows the operation mode for the ERS set. The ERS set is allowed when the following five conditions are met.
(1) The ERS set has been reset.
(2) The main switch for setting the ERS is off.
(3) The engine is rotating (e.g. at 400±50 r.p.m. or higher).
(4) The alternator is generating.
(5) The driver seat door is closed (as detected by the door switch)

The ERS may be reset manually by depressing the main switch or automatically as will be discussed hereinbelow. The engine rotation is detected by the engine r.p.m. (3) and the generation by the alternator (4) in order to exactly detect the rotation of the engine.

FIG. 3 shows the operation mode of the automatic engine stop by the ERS. The engine is automatically stopped when the following conditions (1)–(13) are met.
(1) The ERS has been set.
(2) The engine r.p.m. is below a predetermined r.p.m. (e.g. 850 r.p.m.).
(3) The clutch upper switch 18A and the clutch lower switch 18B are both off. That is, the clatch pedal 16 is not stepped on.
(4) The turn signal switch 36 is off. That is, the right turn signal is not produced.
(5) The head lamp switch is off.
(6) The wiper switch 34 is off.
(7) The water temperature sensor 22 is off. That is, the temperature of the engine coolant is within a predetermined temperature range (e.g. 75° C.–105° C.).
(8) The air condition magnet switch 30 is off.
(9) A predetermined time period (e.g. 4 seconds) has elapsed since the start of the engine by the ERS.
(10) The car is stopped.
(11) The slope sensor 50 is off.
(12) The idle switch 52 is off.
(13) The defogger switch 54 is off.

The condition (2) above, that is, the engine r.p.m. of no higher than 850 r.p.m. was selected to prevent the automatic engine stop during the racing, and the condition (4) above was selected because the driver must pay attention to the presence or absence of an opposing car when the car is to make right turn and it is not desirable to stop the engine under such a condition. The conditions (5),(6),(8) and (13) above were selected to prevent the battery from being overdischarged by stopping the engine under a high electric load condition.

The condition (7) above was selected to prevent the engine from being stopped at a low or high temperature condition of the engine coolant because the engine is hard to start under such a condition. The condition (9) above was selected because the automatic stop of the engine is carried out only after the start of the engine by the ERS. The condition (10) above, that is, "the car is stopped" is determined by the presence or absence of a change is the level of the detection signal (pulse train signal) from the car velocity sensor 12. The condition (3) above was selected because the clatch pedal is to be stepped on only when the engine is started or the gear position is changed and the engine is started by stepping on the clutch pedal in the present apparatus.

As explained above, the engine r.p.m. signal and the clutch signal associated with the clutch pedal are used to determine the condition for the automatic engine stop.

FIG. 4 shows the operation mode of the automatic engine start by the ERS. The automatic engine start is carried out when the following four conditions are met, provided that the transmission is in the neutral position.
(1) The ERS has been set.
(2) The engine r.p.m. is below a predetermined r.p.m. (e.g. 50 r.p.m.).
(3) The alternator is not generating.
(4) The clutch lower switch is on. That is, the clatch pedal is fully stepped on.

The conditions (2) and (3) above were selected to determine the engine stop condition. Both the engine r.p.m. signal and the alternator generation signal are used to determine the condition in order to assure the positive determination even when one of those signals is not supplied to the control circuit 1.

The reset of the ERS is carried out in the following manner.

(A) Manual reset

After the main switch 10 has been depressed once, it is depressed again. Then the ERS is reset.

(B) Automatic reset (1) The ignition switch is manually actuated to restart the engine.
(2) The driver seat door is opened.
(3) The battery voltage drops.
(4) In the restart of the engine, more than a certain time period (e.g. 2 seconds) is taken before the engine r.p.m. reaches a predetermined r.p.m. (e.g. 550 r.p.m.).

In those cases, the ERS is automatically reset. The condition (1) above was selected because the driver may forget that the engine has been automatically stopped and may try to restart the engine by a key switch as a practice, and the condition (2) above was selected because the driver may be replaced by a person who is not familiar with the ERS. The conditions (3) and (4) were selected because the engine will be hardly restarted if the ERS is operated under a low battery power condition. Accordingly, the engine is started by the ERS and after the engine has been started the ERS is reset.

Figure 5:
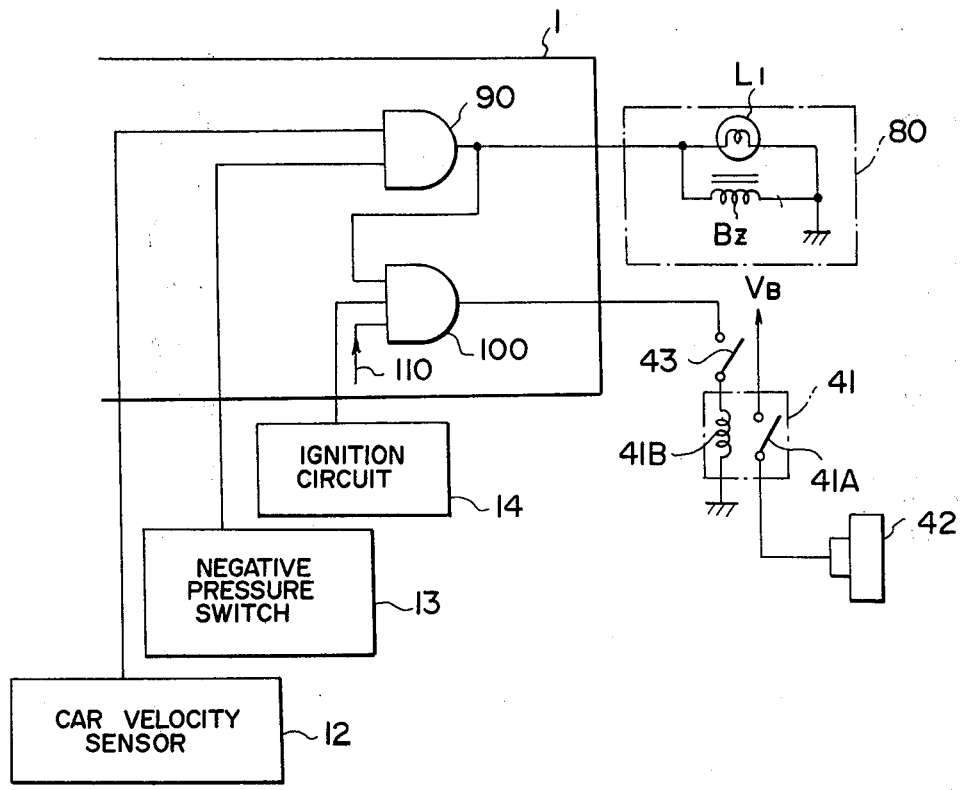
FIG. 5 shows a circuit diagram of a major portion of the automatic engine stop and start apparatus of the present invention.

FIG. 5 shows a configuration of a major portion of the automatic engine stop and start apparatus of the present invention. The detection outputs of the car velocity sensor 12 and the negative pressure switch 13 which detects the booster pressure of the brake are supplied to an AND gate 90 in the control circuit 1. The detection output of the car velocity sensor 12 is logical "1" when the car velocity is equal to or higher than a predetermined speed (e.g. 5 km/h) and logical "0" when it is equal to or lower than a predetermined speed (e.g. 2 km/h). The detection output of the negative pressure switch 13 is logical "1" when the booster pressure is equal to or lower than a predetermined pressure (e.g. −100 mm Hg) and logical "0" when it is equal to or higher than a predetermined pressure (e.g. −200 mm Hg).

Now, when the car velocity is higher than the predetermined speed (5 km/h) and the booster pressure is lower than the predetermined pressure (−100 mm Hg), the AND gate 90 produces a logical "1" signal. As a result, the alarm lamp L1 of the alarm unit 80 is turned on and the buzzer BZ is activated to issue the alarm to the driver.

On the other hand, the output of the AND gate 90 is supplied to another AND gate 100, to which the ignition signal (engine r.p.m. signal) from the ignition circuit 14 and a discrimination signal 110 which discriminates whether the engine is in the automatic engine stop condition or not are applied. The engine r.p.m. signal from the ignition circuit 14 is logical "1" when the engine r.p.m. is equal to or lower than a predetermined r.p.m. (e.g. 50 r.p.m.) and logical "0" when it is equal to or higher than a predetermined r.p.m. (e.g. 450 r.p.m.), and the discrimination signal 110 is logical "1" in the automatic engine stop condition and logical "0" in other condition.

When the engine has been automatically stopped by the ERS, the engine r.p.m. is below the predetermined r.p.m. (50 r.p.m.) and the AND gate 90 produces the logical "1" signal, the AND gate 100 produces a logical "1" signal. If the transmission is shifted to the neutral position, the neutral switch 43 is closed so that a relay coil 41B of the starter relay 41 is energized. As a result, a contact 41A is closed and a battery voltage $V_B$ is applied to the starter 42 to start the engine. In this manner, the engine is restarted under the automatic engine stop condition in order to raise the booster pressure of the brake and enhance the braking force.

It should be apparent to those skilled in the art that the above-described embodiment represents but one of the many possible specific embodiments of the present invention. Numerous and varied embodiments can be devised by those skilled in the art without departing from the spirit and scope of the present invention.

What is claimed is:

1. An automatic engine stop and start apparatus comprising:
    detection means for detecting operational conditions of a car;
    means for setting and resetting an automatic engine stop and start function;
    means for detecting necessity for braking the car;
    alarm means responsive to a control signal for issuing an alarm;
    a control circuit responsive to the output signals from said detection means and said setting and resetting means for producing a control signal to automatically stop or start an engine under a predetermined condition; and
    said control circuit producing said control signal to cause said alarm means to issue the alarm when the car starts to move and a car velocity exceeds a predetermined speed and a booster pressure of a brake falls below a predetermined level while the engine has been automatically stopped after the automatic engine stop or start function was set and the car is to be braked.

2. An automatic engine stop and start apparatus according to claim 1 wherein said detection means for detecting the operational conditions of the car include a car velocity sensor for detecting the car velocity, a negative pressure switch for detecting the booster pressure of the brake, an ignition circuit for producing an ignition pulse signal, a water temperature sensor for detecting a temperature of engine coolant, an oil pressure switch for detecting an oil pressure of engine oil, a clutch switch for detecting step-on amount of a clutch pedal, a switch for indicating a generating condition of an alternator, a magnet switch for controlling the activation of an air conditioner, a head lamp switch for turning on and off head lamps, a wiper switch for detecting the activation of a wiper, a turn signal switch for detecting right turn condition of the car, a door switch for detecting open or closed condition of a driver seat door, an idle switch for detecting an idle condition of the engine, and a defogger switch for detecting the activation of a defogger.

3. An automatic engine stop and start apparatus according to claim 2 wherein said clutch switch includes a clutch upper switch for producing a signal to inhibit the stop of the engine when the clutch pedal is stepped on by no less than 30% of a full stroke and a clutch lower switch for producing a signal to allow the automatic start of the engine when the clutch pedal is fully stepped on.

4. An automatic engine stop and start apparatus according to claim 1 or 2 wherein said means for setting and resetting the automatic engine stop and start function is a main switch independent from an engine key switch.

5. An automatic engine stop and start apparatus according to claim 1 wherein said means for detecting the necessity of the brake for the car is a slope sensor for detecting whether a gradient of a slope on which the car parks is no less than a predetermined gradient or not.

6. An automatic engine stop and start apparatus according to claim 5 wherein said slope sensor produces a signal indicating the necessity of the brake when the gradient of the slope is no less than two degrees.

7. An automatic engine stop and start apparatus according to claim 1 wherein said alarm means includes a parallel circuit of display device and a buzzer, one terminal of said parallel circuit being grounded and the other terminal thereof being connected to an output terminal of said control circuit.

8. An automatic engine stop and start apparatus according to claim 7 wherein said display device is a lamp.

9. An automatic engine stop and start apparatus according to claim 7 wherein said display device is a light emitting diode.

10. An automatic engine stop and start apparatus according to claim 7 wherein said display device is a liquid crystal device.

11. An automatic engine stop and start apparatus according to claim 1 wherein said control circuit produces said control signal to cause said alarm means to issue the alarm when the car starts to move while the engine has been automatically stopped and the car is to be braked and the car velocity exceeds 5 km/h and the booster pressure of the brake falls below −100 mm Hg.

12. An automatic engine stop and start apparatus according to claim 1 wherein said control circuit comprises a microcomputer.

13. An automatic engine stop and start apparatus comprising:
   detection means for detecting operational conditions of a car;
   means for setting and resetting an automatic engine stop and start function;
   means for detecting necessity for braking the car;
   alarm means responsive to a control signal for issuing an alarm; and
   a control circuit responsive to the output signal from said detection means and said setting and resetting means for producing a control signal to automatically stop or start an engine under a predetermined condition;
   said control circuit producing said control signal to cause said alarm means to issue the alarm when the car starts to move and a car velocity exceeds a predetermined speed and a booster pressure of a brake falls below a predetermined level while the engine has been automatically stopped after the automatic engine stop or start function was set and the car is to be braked, and said control signal to automatically start the engine when a transmission is shifted to a neutral position.

14. An automatic engine stop and start apparatus according to claim 13 wherein said detection means for detecting the operational conditions of the car include a car velocity sensor for detecting the car velocity, a negative pressure switch for detecting the booster pressure of the brake, an ignition circuit for producing an ignition pulse signal, a water temperature sensor for detecting a temperature of engine coolant, an oil pressure switch for detecting an oil pressure of engine oil, a clatch switch for detecting step-on amount of a clutch pedal, a switch for indicating a generating condition of an alternator, a magnet switch for controlling the activation of an air condition, a head lamp switch for turning on and off head lamps, a wiper switch for detecting the activation of a wiper, a turn signal switch for detecting right turn condition of the car, a door switch for detecting open or closed condition of a driver seat door, an idle switch for detecting an idle condition of the engine, and a defogger switch for detecting the activation of a defogger.

15. An automatic engine stop and start apparatus according to claim 14 wherein said clutch switch includes a clutch upper switch for producing a signal to inhibit the stop of the engine when the clutch pedal is stepped on by no less than 30% of a full stroke and a clutch lower switch for producing a signal to allow the automatic start of the engine when the clutch pedal is fully stepped on.

16. An automatic engine stop and start apparatus according to claim 13 or 14 wherein said means for setting and resetting the automatic engine stop and start function is a main switch independent from an engine key switch.

17. An automatic engine stop and start according to claim 13 wherein said means for detecting the necessity of the brake for the car is a slope sensor for detecting whether a gradient of a slope on which the car parks is no less than a predetermined gradient or not.

18. An automatic engine stop and start apparatus according to claim 17 wherein said slope sensor produces a signal indicating the necessity of the brake when the gradient of the slope is no less than two degrees.

19. An automatic engine stop and start apparatus according to claim 13 wherein said alarm means includes a parallel circuit of a display device and a buzzer, one terminal of said parallel circuit being grounded and the other terminal thereof being connected to an output terminal of said control circuit.

20. An automatic engine stop and start apparatus according to claim 19 wherein said display device is a lamp.

21. An automatic engine stop and start apparatus according to claim 19 wherein said display device is a light emitting diode.

22. An automatic engine stop and start apparatus according to claim 19 wherein said display device is a liquid crystal device.

23. An automatic engine stop and start apparatus according to claim 13 wherein said control circuit produces said control signal to cause said alarm means to issue the alarm when the car starts to move while the engine has been automatically stopped and the car is to be braked and the car velocity exceeds 5 km/h and the booster pressure of the brake falls below −100 mm Hg.

24. An automatic engine stop and start apparatus according to claim 13 wherein said control circuit comprises a micro computer.

* * * * *